United States Patent
Taga

(10) Patent No.: US 12,031,608 B2
(45) Date of Patent: *Jul. 9, 2024

(54) TRANSMISSION BELT

(71) Applicant: BANDO CHEMICAL INDUSTRIES, LTD., Kobe (JP)

(72) Inventor: Atsushi Taga, Kobe (JP)

(73) Assignee: BANDO CHEMICAL INDUSTRIES, LTD., Kobe (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/211,087

(22) Filed: Jun. 16, 2023

(65) Prior Publication Data

US 2023/0332671 A1 Oct. 19, 2023

Related U.S. Application Data

(60) Division of application No. 17/994,236, filed on Nov. 25, 2022, now Pat. No. 11,708,879, which is a (Continued)

(30) Foreign Application Priority Data

Jul. 3, 2020 (JP) .................. 2020-115525

(51) Int. Cl.
*F16G 1/28* (2006.01)
*D02G 3/26* (2006.01)
*D02G 3/44* (2006.01)

(52) U.S. Cl.
CPC .................. *F16G 1/28* (2013.01); *D02G 3/26* (2013.01); *D02G 3/44* (2013.01); *D10B 2101/12* (2013.01); *D10B 2505/02* (2013.01)

(58) Field of Classification Search
CPC ... F16G 1/28; D02G 3/26; D02G 3/44; D10B 2101/12; E10B 2505/02
See application file for complete search history.

(56) References Cited

U.S. PATENT DOCUMENTS

2007/0232429 A1 10/2007 Knox
2011/0129647 A1 6/2011 Duke, Jr. et al.
(Continued)

FOREIGN PATENT DOCUMENTS

EP 2 719 824 A1 4/2016
JP H03-185139 A 8/1991
(Continued)

OTHER PUBLICATIONS

Encyclopedic dictionary of chemistry, Elastomer, Ooki Michinori, et al., 1st edition, 5th printing, Jun. 1998; 1: 299.
(Continued)

*Primary Examiner* — Michael R Mansen
*Assistant Examiner* — Mark K Buse
(74) *Attorney, Agent, or Firm* — Maschoff Brennan

(57) ABSTRACT

A power transmission belt includes a belt body made of an elastomer, and a cord made of carbon fibers and provided to be embedded in the belt body and to form a helical pattern having a pitch in the belt width direction. When the cord is viewed from a side orthogonal to its length direction, an angle θ of an outermost filament in the filament bundle of the carbon fibers forming the cord with respect to the length direction of the cord is 8° or more to 20° or less.

11 Claims, 4 Drawing Sheets

Related U.S. Application Data continuation of application No. PCT/JP2021/024895, filed on Jul. 1, 2021.

(56) References Cited

U.S. PATENT DOCUMENTS

| | | | |
|---|---|---|---|
| 2015/0292145 A1* | 10/2015 | Sonoda | D21H 17/53 442/60 |
| 2016/0221637 A1 | 8/2016 | Osaki et al. | |
| 2017/0029578 A1* | 2/2017 | Wu | D06M 15/564 |
| 2017/0191545 A1 | 7/2017 | Sekiguchi et al. | |
| 2018/0223056 A1* | 8/2018 | Duke, Jr. | D06M 15/568 |
| 2020/0217396 A1* | 7/2020 | Tamura | D02G 3/447 |
| 2020/0378469 A1* | 12/2020 | Tamura | D02G 3/447 |
| 2021/0222755 A1* | 7/2021 | Tomoda | D02G 3/16 |
| 2023/0085893 A1* | 3/2023 | Taga | D02G 3/44 474/237 |
| 2023/0313861 A1* | 10/2023 | Yoshimura | D06M 15/41 474/268 |

FOREIGN PATENT DOCUMENTS

| | | |
|---|---|---|
| JP | 2005-24075 A | 1/2005 |
| JP | 2006-90338 A | 4/2006 |
| JP | 2006-298297 A | 11/2006 |
| JP | 2008-126214 A | 6/2008 |
| JP | 2009-532633 A | 9/2009 |
| JP | 2010-024564 A | 2/2010 |
| JP | 2010-096229 A | 4/2010 |
| JP | 2010-249310 A | 11/2010 |
| JP | 2011-241502 A | 12/2011 |
| JP | 2015-048870 A | 3/2015 |
| JP | 2016-010866 A | 1/2016 |
| JP | 2016-089294 A | 5/2016 |
| JP | 2016-117840 A | 6/2016 |
| JP | 2017-179634 A | 10/2017 |
| JP | 2018-119227 A | 8/2018 |
| JP | 2019-100541 A | 6/2019 |
| JP | 2019-533124 A | 11/2019 |
| JP | 2020-038008 A | 3/2020 |
| WO | 2014/208626 A1 | 12/2014 |

OTHER PUBLICATIONS

Teijin Limited HP, Integration of Toho Tenax Co., Nov. 30, 2017.
TohoTenax, Delivery programme and characteristics for Tenax HTA Filament yarn, Apr. 2011.

* cited by examiner

TRANSMISSION BELT

CROSS-REFERENCE TO RELATED APPLICATION

This is a continuation of International Application No. PCT/JP2021/024895 filed on Jul. 1, 2021, which claims priority to Japanese Patent Application No. 2020-115525 filed on Jul. 3, 2020. The entire disclosures of these applications are incorporated by reference herein.

BACKGROUND

The present invention relates to a power transmission belt.

A power transmission belt using a cord made of carbon fibers has been known. For example, Japanese Unexamined Patent Publication No. 2005-24075 discloses a toothed belt in which a cord made of carbon fibers is embedded in a belt body made of rubber.

SUMMARY

The present invention is directed to a power transmission belt including a belt body made of an elastomer, and a cord made of carbon fibers and provided to be embedded in the belt body and to form a helical pattern having a pitch in a belt width direction. When the cord is viewed from a side orthogonal to its length direction, an angle of an outermost filament in a filament bundle of the carbon fibers forming the cord with respect to the length direction of the cord is 8° or more to 20° or less.

DESCRIPTION OF EMBODIMENT

An embodiment will be described in detail below with reference to the drawings.

Figure 1A:
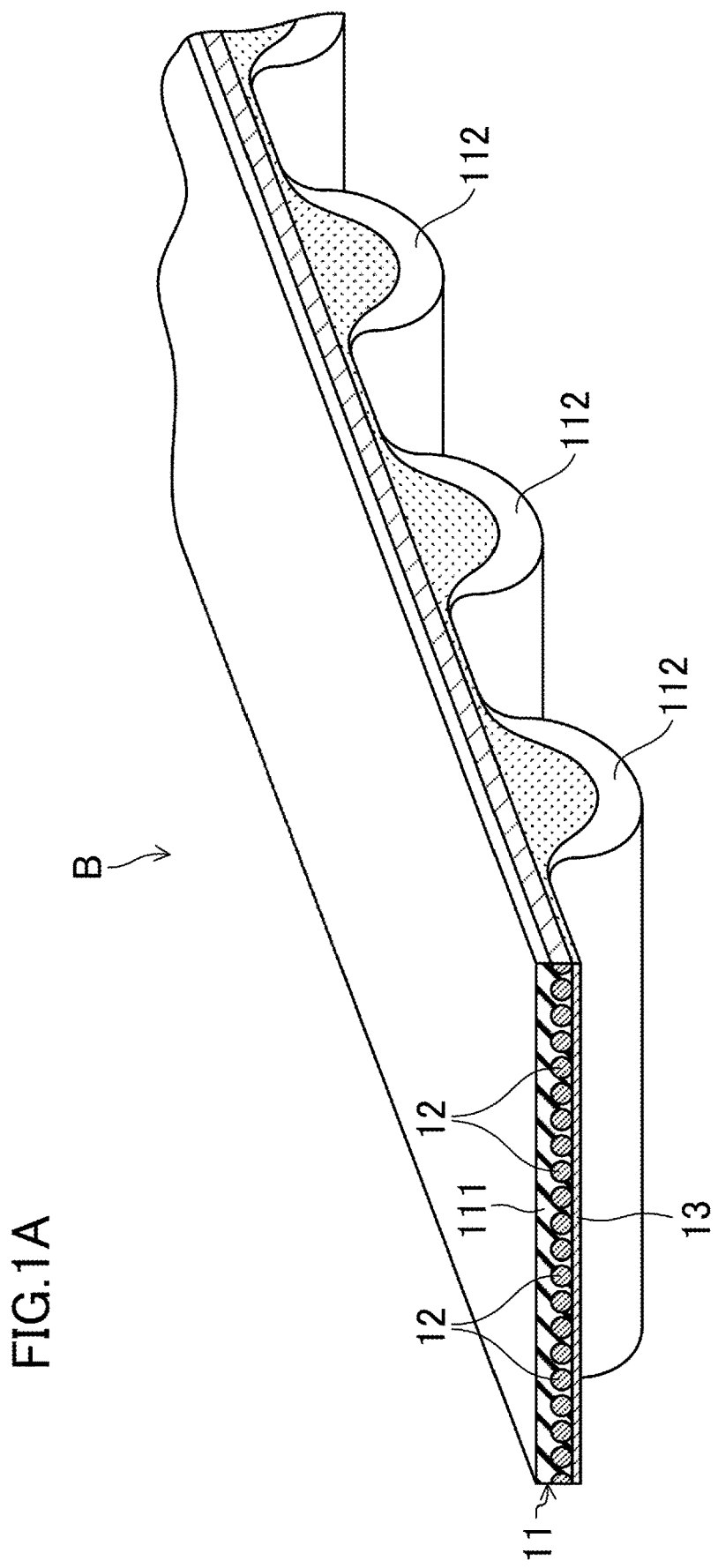
FIG. 1A is a perspective view of a piece of a toothed belt of an embodiment.
Figure 1B:
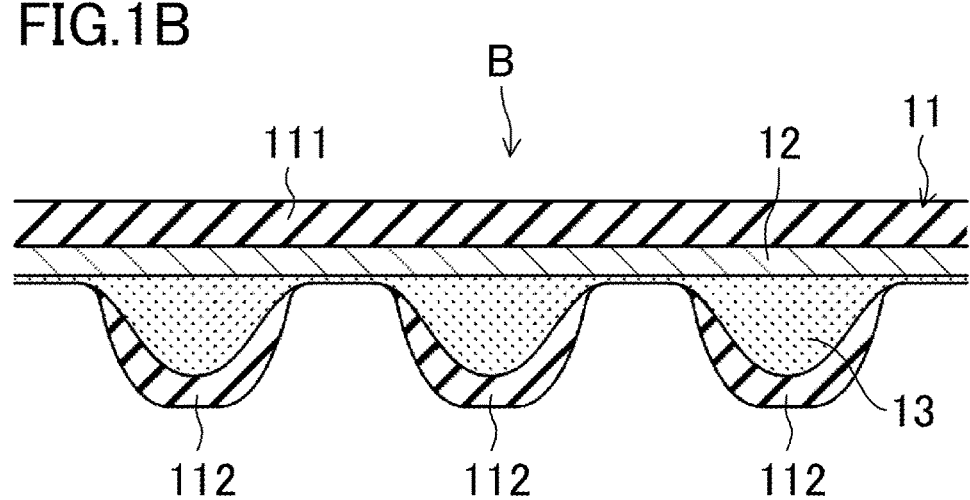
FIG. 1B is a longitudinal cross-sectional view of a portion of the toothed belt of the embodiment.

FIGS. 1A and 1B illustrate a toothed belt B of an embodiment. The toothed belt B of the embodiment is an engagement power transmission belt and is advantageously used for high load transmission of machine tools, printing machines, textile machines, and injection machines, for example. The toothed belt B of the embodiment has a belt length of, for example, 500 mm or more to 3000 mm or less. The toothed belt B of the embodiment has a belt width of, for example, 10 mm or more to 200 mm or less. The toothed belt B of the embodiment has a (maximum) belt thickness of, for example, 3 mm or more to 20 mm or less.

The toothed belt B of the embodiment includes an elastomer-made endless toothed belt body 11 made of polyurethane resin. The toothed belt body 11 includes a flat band portion 111 having a horizontally elongated rectangular cross-section and a plurality of teeth 112 provided on the inner periphery of the flat band portion 111 so as to be integral therewith. The teeth 112 are provided at a constant pitch in a belt length direction.

Examples of the tooth profile of the each tooth 112 in the side view include an arc tooth profile of the super torque synchronous (STS) belts in which both sides of the tooth are bowed outward in the form of an arc and a trapezoidal tooth profile. The number of teeth 112 is, for example, 30 or more to 400 or less. The teeth 112 each have a width (the maximum dimension in the belt length direction) of, for example, 2 mm or more to 10 mm or less. The teeth 112 each have a height of, for example, 2 mm or more to 8 mm or less. The teeth 112 are arranged at a pitch of, for example 8 mm or more to 14 mm or less.

The polyurethane resin forming the toothed belt body 11 is obtained by heating, pressurizing, and curing an urethan composition which is obtained by blending a curing agent, a plasticizer, and the like to a urethan prepolymer.

The urethan prepolymer is a relatively low molecular weight urethan compound which is obtained by a reaction between an isocyanate component and a polyol component and having a plurality of NCO groups at its terminals. Examples of the isocyanate component include tolylene diisocyanate (TDI) and diphenylmethane diisocyanate (MDI). Examples of the polyol component include poly tetramethylene ether glycol (PTMG). The urethan prepolymer may be composed of a single urethan prepolymer or a plurality of urethan compounds blended.

Examples of the curing agent include amine compounds such as 1,4-phenylene diamine, 2,6-diamino toluene, 1,5-naphthalene diamine, 4,4'-diamino diphenylmethane, and 3,3'-dichloro-4,4'-diamino diphenylmethane (MOCA). The curing agent suitably contains one kind or two or more kinds of them. The amine compound serving as a curing agent is suitably blended to have an a value ($NH_2$ group/NCO group) of 0.70 or more to 1.10 or less. The a value is a ratio of the amount of $NH_2$ groups by mole in the curing agent to the amount of NCO groups by mole in the urethan prepolymer.

Examples of the plasticizer include: dialkyl phthalates such as dibutylphthalate (DBP) and dioctyl phthalate (DOP); dialkyl adipates such as dioctyl adipate (DOA); and dialkyl sebacate such as dioctyl sebacate (DOS). The plasticizer suitably contains one kind or two or more kinds of them. The plasticizer is blended at 3 parts by mass or more to 20 parts by mass or less relative to 100 parts by mass of the urethan prepolymer.

Example of the other compound ingredients include a colorant, an antifoaming agent, and a stabilizer.

The polyurethane resin forming the toothed belt body 11 has a hardness of, for example, 70° or more to 100° or less. The hardness of the polyurethane resin is measured in accordance with JIS K 7312:1996.

Figure 2:
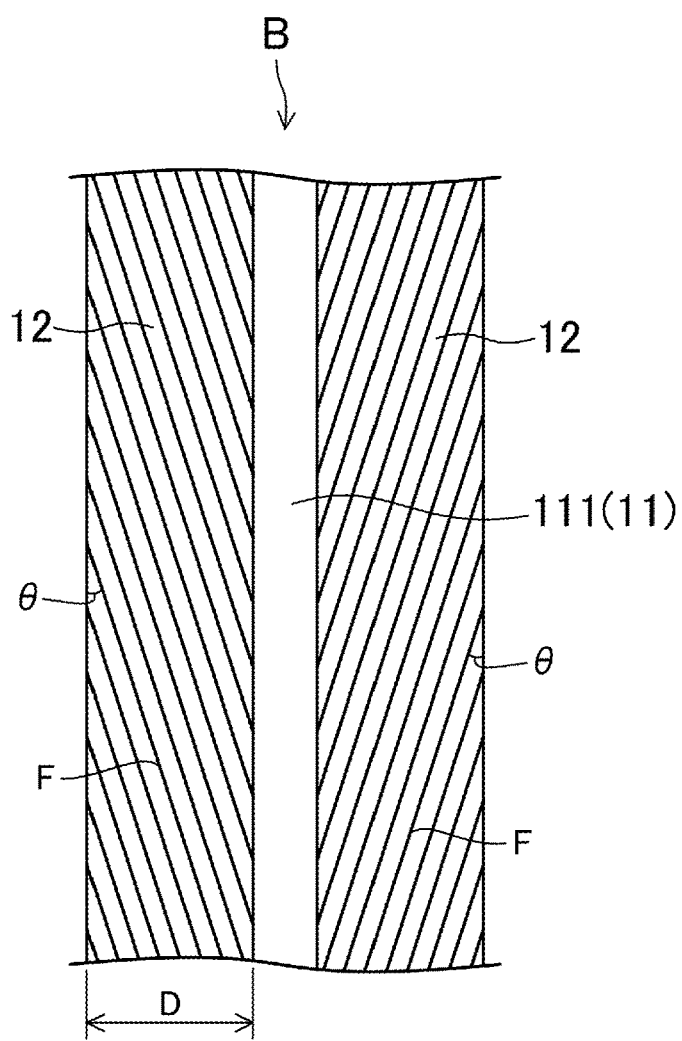
FIG. 2 is a front view of a cord embedded in a toothed belt body, as viewed from a side orthogonal to the length direction.

The toothed belt B of the embodiment includes, as illustrated in FIG. 2, a cord 12 made of carbon fibers and embedded in the flat band portion 111 of the toothed belt body 11. The cord 12 has a diameter D of suitably 0.4 mm or more to 2.7 mm or less, more suitably 0.5 mm or more to 2.4 mm or less, in terms of obtaining excellent durability.

The carbon fibers forming the cord 12 are suitably PAN-based carbon fibers, in terms of obtaining excellent durability. Filaments F of the carbon fibers each have a diameter of suitably 4 μm or more to 9 μm or less, more suitably 6 μm or more to 8 μm or less.

The total number of filaments F of the carbon fibers forming the cord 12 is suitably 3000 (3K) or more to 60000 (60K) or less, more suitably 9000 (9K) or more to 54000 (54K) or less, yet more suitably 12000 (12K) or more to 48000 (48K) or less, in terms of obtaining excellent durability. The carbon fibers forming the cord 12 have a fiber fineness of suitably 200 tex or more to 4000 tex or less, more suitably 600 tex or more to 3600 tex or less, yet more suitably 800 tex or more to 3200 tex or less, in terms of the same.

The cord 12 is suitably a twisted yarn, in terms of obtaining excellent durability. The twisted yarn forming the cord 12 includes a single twist yarn, a plied yarn, and a lang's lay. The cord 12 of the twisted yarn is suitably a single twist yarn obtained by twisting a filament bundle of the carbon fibers in one direction. For the cord 12 of the single twist yarn, either an S-twist yarn or a Z-twist yarn may be used, or both of them may be used.

If the total number of filaments F of the carbon fibers forming the cord 12 of the single twist yarn is less than 24000 (24K), the number of twists of the cord 12 per 10 cm length is suitably 2.0/10 cm or more to 25.0/10 cm or less, more suitably 3.0/10 cm or more to 19.0/10 cm or less, yet more suitably 5.0/10 cm or more to 11.0/10 cm or less, in terms of obtaining excellent durability. If the total number of filaments F of the carbon fibers forming the cord 12 of the single twist yarn is 24000 (24K) or more, the number of twists of the cord 12 per 10 cm length is suitably 1.5/10 cm or more to 7.5/10 cm or less, more suitably 2.3/10 cm or more to 6.6/10 cm or less, yet more suitably 3.5/10 cm or more to 5.5/10 cm or less, in terms of obtaining excellent durability.

When the cord 12 is viewed from a side orthogonal to its length direction, an angle θ of an outermost filament F in the filament bundle of the carbon fibers forming the cord 12 with respect to the length direction of the cord 12 is 8° or more to 20° or less. The angle θ of the filament F with respect to the length direction of the cord 12 is suitably 8° or more to 20° or less, more suitably 10° or more to 19° or less, in terms of obtaining excellent durability.

The cord 12 is provided to form a helical pattern with a pitch in the belt width direction. The cord 12 may be made of two yarns of the S-twist yarn and the Z-twist yarn arranged in a double helix form. The cords 12 are disposed to extend in parallel with each other at intervals in the belt width direction, and the number of cords 12 per 10 mm belt width is suitably 3/10 mm or more to 16/10 mm or less, more suitably 4/10 mm or more to 15/10 mm or less, in terms of obtaining excellent durability. The cord 12 is provided to form a helical pattern with a pitch in the belt length direction. Thus, its length direction is inclined with respect to the belt length direction. However, the angle of the inclination is very small. Thus, the angle θ of the outermost filament of the filament bundle of the carbon fibers forming the cord 12 with respect to the length direction of the cord 12 is substantially the same as the angle of the filament F with respect to the belt length direction.

The cord 12 has been suitably subjected to adhesion treatment such as immersing it in a liquid adhesive agent and then drying before molding.

The toothed belt B of the embodiment further includes unwoven fabric 13 embedded along the belt length direction on the inner peripheral side of the toothed belt body 11 from the position at which the cord 12 is embedded in the belt thickness direction. The unwoven fabric 13 may be made of a single sheet or a plurality of sheets.

The unwoven fabric 13 contains polyurethane resin forming the toothed belt body 11, and provided to form a layer in a side view. Portions of the unwoven fabric 13 corresponding to the respective teeth 112 extend inside the teeth 112 so as to bulge toward inner periphery in a side view and expand thickly in the belt thickness direction. Portions of the unwoven fabric 13 corresponding to the portions between the teeth 112 are in contact with the cords 12 and are compressed in the belt thickness direction to be thin.

Examples of a fiber material forming the nonwoven fabric 13 include nylon fibers, polyester fibers, aramid fibers, polyketone fibers, and carbon fibers. The unwoven fabric 13 may be made of a single kind of fibers, or a mixture of a plurality of kinds of fibers.

The unwoven fabric 13 has been suitably subjected to adhesion treatment such as immersing it in a liquid adhesive agent and then drying before molding.

The belt tension $T_{0.1}$ per 1 mm belt width at 0.1% of a belt extension rate of the toothed belt B of the embodiment is suitably 30 N/mm or more, more suitably 45 N/mm or more in terms of obtaining excellent durability, and is suitably 50 N/mm or less, more suitably 45 N/mm or less in terms of avoiding impairing of flex fatigue resistance.

The belt tension $T_{0.1}$ is determined as follows. In a 25° C. atmosphere, the toothed belt B according to the embodiment is wrapped around a pair of flat pulleys with a pulley diameter of 95.4 mm in a belt tensile tester such that a belt backface comes into contact with the flat pulleys. Then, one of the flat pulleys is separated from the other flat pulley at a speed of 50 mm/min. At this time, the relationship between displacement between the flat pulleys in pair and the tension detected, starting at the time of generation of the tension detected via either one of the flat pulleys in pair, is recorded. Then, the displacement between the flat pulleys in pair is doubled to calculate the amount of extension of the belt, which is then divided by the belt length of the toothed belt B according to the embodiment under a no-load condition. Thus, the displacement between flat pulleys in pair is converted into the belt extension rate. Further, the tension detected is divided by 2 to calculate the belt tension, which is then divided by the belt width of the toothed belt B according to the embodiment. Thus, the tension detected is converted into the belt tension per 1 mm belt width. Then, the belt tension $T_{0.1}$ is determined based on the relationship between the belt extension rate and the belt tension.

In the toothed belt B according to the embodiment with such a configuration, when the cord 12 is viewed from a side orthogonal to its length direction, an angle θ of an outermost filament F in the filament bundle of the carbon fibers forming the cord 12 with respect to the length direction of the cord 12 is 8° or more to 20° or less. Accordingly, excellent durability can be obtained. This is presumably because the filaments F of the carbon fibers which are a brittle material forming the cord 12 is prevented from being excessively distorted.

Now, a method for forming the toothed belt B of the embodiment will be described.

Figure 3A:
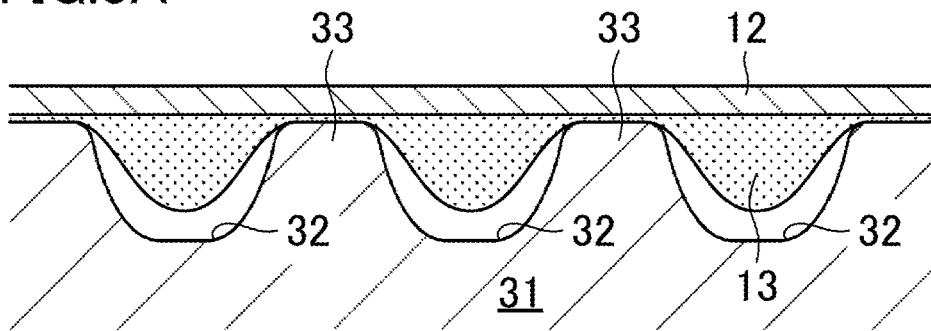
FIG. 3A is a first diagram illustrating a method for forming the toothed belt according to the embodiment.

First, as shown in FIG. 3A, a cylindrical inner mold 31 is covered with the unwoven fabric 13, and the cord 12 is then spirally wound around it. At this time, on the outer periphery of the inner mold 31, recesses 32 with cross sectional shapes corresponding to the respective teeth 112 extending axially are provided at a constant pitch at intervals in a circumferential direction, and ridges 33 extending axially between the recesses 32 are formed. Then, the unwoven fabric 13 and the cord 12 are provided to be supported with the ridges 33.

Figure 3B:
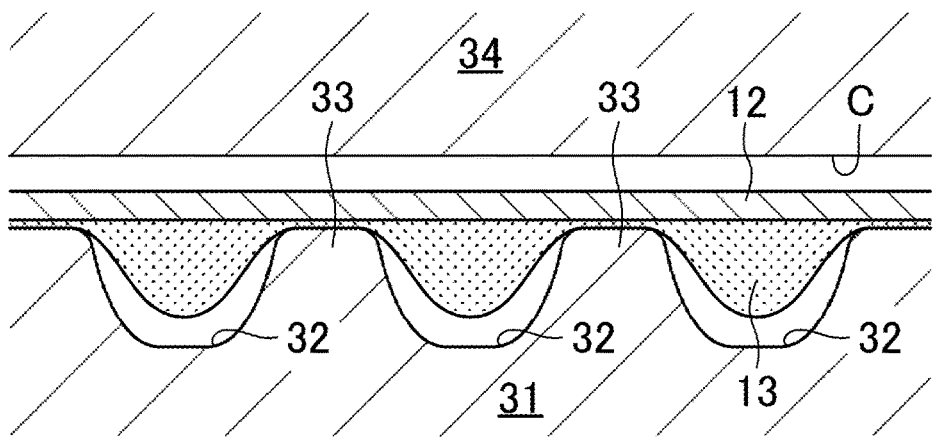
FIG. 3B is a second diagram illustrating the method for forming the toothed belt according to the embodiment.

Then, as shown in FIG. 3B, the inner mold 31 is housed in a cylindrical outer mold 34. At this time, a cavity C for molding the toothed belt body is formed between the inner mold 31 and the outer mold 34.

Figure 3C:
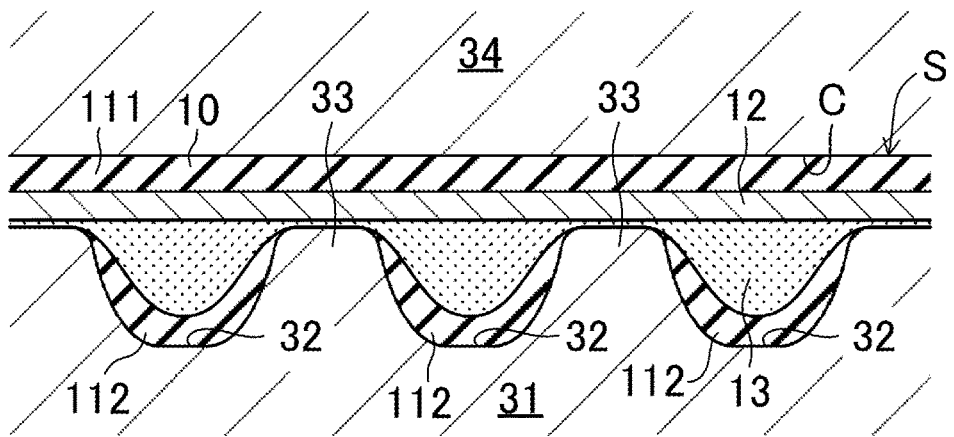
FIG. 3C is a third diagram illustrating the method for forming the toothed belt according to the embodiment.

Subsequently, as shown in FIG. 3C, a liquid urethan composition obtained by blending a compound ingredient into a urethan prepolymer is injected and charged into the closed cavity C. At this time, a toothed belt body 11 of polyurethane resin is formed by the urethan composition flowing and cured. Further, the teeth 112 are formed in the recesses 32. The cord 12 is adhered and embedded in the toothed belt body 11. The urethan composition is impregnated into the unwoven fabric 13 and then cured, and the unwoven fabric 13 is adhered to and embedded in the toothed belt body 11. In this way, the toothed belt body 11, the cord 12, and the unwoven fabric 13 are integrated to form a cylindrical belt slab S.

Finally, the belt slab S is demolded from the inner mold 31 and the outer mold 34, and cut into round slices, whereby the toothed belt B according to the embodiment is obtained.

In the embodiment described above, the toothed belt B is made of the toothed belt body 11, the cord 12, and the unwoven fabric 13, but is not limited thereto. A reinforcing fabric may be provided on the teeth face on the inner periphery side of the toothed belt body and/or the backface on the outer periphery side of the toothed belt body.

In the embodiment, the toothed belt B includes a toothed belt body 11 made of polyurethane resin, but is not particularly limited thereto. The toothed belt body itself may be formed of a crosslinking rubber composition.

In the embodiment, the toothed belt B is shown as a power transmission belt, but the power transmission belt is not particularly limited thereto and may be a flat belt, a V-belt, a V-ribbed belt, or the like.

EXAMPLE

Test Evaluation 1

Toothed Belt

Toothed belts of Example 1 and Comparative Examples 1-1 and 1-2 were prepared. Constituents of each belt will also be shown in Table 1.

Example 1

A STS toothed belt with the same configuration as in the embodiment was prepared as Example 1. The toothed belt of Example 1 had a belt length of 1400 mm, a belt width of 14 mm, and a belt thickness (at maximum) of 8.6 mm Teeth are S14M defined in ISO 13050:2014 (E).

As the urethan composition for forming a toothed belt body, one obtained by blending 13 parts by mass of 3,3'-dichloro-4,4'-diamino diphenylmethane as a curing agent and 10 parts by mass of dioctyl phthalate as a plasticizer to 100 parts by mass of urethan prepolymer was used. A polyurethane resin which forms the toothed belt body had a hardness of 92°, measured based on JIS K7312.

As a cord, a single twist yarn obtained by twisting a filament bundle (the total number of filaments: 48000, a total fiber fineness: 3200 tex) in one direction with the number of twists of the cord per 10 cm length of 4/10 cm was used. The filament bundle was obtained by putting four carbon fibers each with the number of filaments of 12000 (TORAYCA T700SC-12000, manufactured by TORAY INDUSTRIES, INC., 12K, 800 tex, a filament diameter: 7 μm) together. The angle of the outermost filament in the filament bundle of the carbon fibers forming the cord with respect to the length direction of the cord was 10°. For the cord of single twist yarn, a S-twist yarn and a Z-twist yarn were provided, and were subjected to adhesion treatment of immersing them in an adhesive and drying. The S-twist yarn and the Z-twist yarn which form a single twist yarn for the cord were arranged alternately in the belt width direction to form a double helix pattern. The number of cords per 10 mm belt width was four. The cord had a diameter of 2.0 mm.

As unwoven fabric, one made of nylon fibers and formed by needle punching without pressurization was used. The unwoven fabric was not subjected to adhesion treatment.

The toothed belt of Example 1 had a belt strength of 1302 N/mm per 1 mm belt width. The belt tension $T_{0.1}$ was 40.0 N/mm.

Comparative Example 1-1

A toothed belt with the same configuration as in Example 1 except that a plied yarn (the total number of filaments: 48000, the total fiber fineness: 3200 tex) made of carbon fibers was used as the cord was prepared as Comparative Example 1-1. The plied yarn was produced as follows: a filament bundle of carbon fibers with the number of filaments of 12000, which was the same as used in Example 1, was twisted in one direction with the number of twists per 10 cm length of four, thereby forming a first-twist yarn, and four of the first-twist yarn were then put together and twisted in a direction opposite to the direction of twisting the first-twist yarn, with the number of twists per 10 cm length of four. The angle of the outermost filament in the filament bundle of the carbon fibers forming the cord of the plied yarn with respect to the length direction of the cord was 7°.

The toothed belt of Comparative Example 1-1 had a belt strength of 1267 N/mm per 1 mm belt width. The belt tension $T_{0.1}$ was 38.5 N/mm.

Comparative Example 1-2

A toothed belt with the same configuration as in Example 1 except that the number of twists of the cord per 10 cm length was 6/10 cm was prepared as Comparative Example 1-2. The angle of the outermost filament in the filament bundle of the carbon fibers forming the cord with respect to the length direction of the cord was 21°.

The toothed belt of Comparative Example 1-2 had a belt strength of 640 N/mm per 1 mm belt width. The belt tension $T_{0.1}$ was 41.0 N/mm

TABLE 1

|  | Example 1 | Comparative Example 1-1 | Comparative Example 1-2 |
|---|---|---|---|
| Tooth Arrangement Pitch (mm) | 14 | 14 | 14 |
| Total Number of Filaments | 32000 | 32000 | 32000 |
| Number of Twists (per 10 cm) | 4 | 4 (First-Twist Yarn)/4 (Second-Twist Yarn) | 6 |
| Angle θ of Filament (°) | 10 | 7 | 21 |
| Number of Cords (per 10 mm) | 4 | 4 | 4 |
| Belt Strength (N/mm) | 1302 | 1267 | 640 |
| Belt Tension $T_{0.1}$ (N/mm) | 40.0 | 38.5 | 41.0 |
| Belt Durability Life (hour) | 756 | 26 | 65 |

Belt Durability Test

Figure 4:
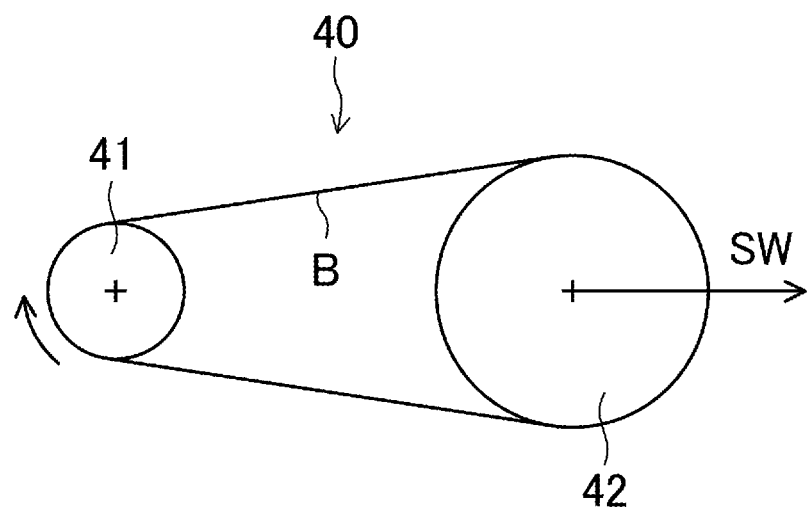
FIG. 4 is a view of a layout of pulleys of a belt running tester.

FIG. 4 shows a layout of pulleys in the belt running tester 40 used in a belt durability test. The belt running tester 40 includes a drive pulley 41 with 22 teeth and a driven pulley 42 with 33 teeth, provided on the right side of the drive pulley 41. The driven pulley 42 is provided to be movable to the left or right side, and is configured to be applied with an axial load and a load torque.

In a 60° C. atmosphere, each of the toothed belts B of Example 1 and Comparative Examples 1-1 and 1-2 was wrapped around the drive pulley 41 and the driven pulley 42, applied with a fixed axial load (SW) of 1960 N to apply tension of 1000 N to the toothed belt B, and applied with a load torque of 120 N·n. In this state, the drive pulley 41 was rotated at the number of revolutions of 1800 rpm. Then, the time until the toothed belt B was broken was measured, and the time was used as a belt durability life.

Test Results

Table 1 shows the test results. As can be seen, durability in Example 1 was significantly higher than that in each of Comparative Examples 1-1 and 1-2.

Test Evaluation 2

Toothed Belt

Toothed belts of Examples 2-1 and 2-2 and Comparative Examples 2-1 and 2-2 were prepared. The configuration of each belt will also be shown in Table 2.

Example 2-1

A STS toothed belt with the same configuration as in the embodiment was prepared as Example 2-1. The toothed belt of Example 2-1 had a belt length of 800 mm, a belt width of 8 mm, and a belt thickness (at maximum) of 4.8 mm. The teeth were S8M defined in ISO 13050:2014 (E).

As a cord, a single twist yarn obtained by twisting a filament bundle of carbon fibers each with the number of filaments of 12000, which is the same as the one used in Example 1, in one direction with the number of twists per 10 cm length of 6/10 cm was used. The angle of the outermost filament in the filament bundle of the carbon fibers forming the cord with respect to the length direction of the cord was 9°. For the cord of single twist yarn, a S-twist yarn and a Z-twist yarn were provided, and were subjected to adhesion treatment of immersing them in an adhesive and drying. The S-twist yarn and the Z-twist yarn which form a single twist yarn for the cord were arranged alternately in the belt width direction to form a double helix pattern. The number of cords per 10 mm of the belt width was eight. The cord had a diameter of 0.9 mm.

The urethan composition for forming a toothed belt body and unwoven fabric were the same as those used in Example 1.

The toothed belt of Example 2-1 had a belt strength of 1150 N/mm per 1 mm belt width.

The belt tension $T_{0.1}$ was 44.4 N/mm.

Example 2-2

A toothed belt with the same configuration as in Example 2-1 except that the number of twists of the cord per 10 cm length was 10/10 cm was prepared as Example 2-2. The angle of the outermost filament in the filament bundle of the carbon fibers forming the cord with respect to the length direction of the cord was 19°.

The toothed belt of Example 2-2 had a belt strength of 738 N/mm per 1 mm belt width. The belt tension $T_{0.1}$ was 40.5 N/mm.

Comparative Example 2-1

A toothed belt with the same configuration as in Comparative Example 2-1 except that the number of twists of the cord per 10 cm length was 4/10 cm was prepared as Comparative Example 2-1. The angle of the outermost filament in the filament bundle of the carbon fibers forming the cord with respect to the length direction of the cord was 6°.

The toothed belt of Comparative Example 2-1 had a belt strength of 811 N/mm per 1 mm belt width. The belt tension $T_{0.1}$ was 32.7 N/mm.

Comparative Example 2-2

A toothed belt with the same configuration as in Example 2-1 except that the number of twists of the cord per 10 cm length was 12/10 cm was prepared as Comparative Example 2-2. The angle of the outermost filament in the filament bundle of the carbon fibers forming the cord with respect to the length direction of the cord was 21°.

The toothed belt of Comparative Example 2-2 had a belt strength of 694 N/mm per 1 mm belt width. The belt tension $T_{0.1}$ was 42.8 N/mm

TABLE 2

|  | Example 2-1 | Example 2-2 | Comparative Example 2-1 | Comparative Example 2-2 |
|---|---|---|---|---|
| Tooth Arrangement Pitch (mm) | 8 | 8 | 8 | 8 |
| Total Number of Filaments | 8000 | 8000 | 8000 | 8000 |
| Number of twists (time/10 cm) | 6 | 10 | 4 | 12 |
| Angle θ of Filament (°) | 9 | 19 | 6 | 21 |
| Number of Cords (per 10 mm) | 8 | 8 | 8 | 8 |
| Belt Strength (N/mm) | 1150 | 738 | 811 | 694 |
| Belt Tension $T_{0.1}$ (N/mm) | 44.4 | 40.5 | 32.7 | 42.8 |
| Belt Durability Life (hour) | 270 | 491 | 41 | 81 |

Belt Durability Test

Used was a belt running tester 40 with a layout of pulleys shown in FIG. 4, which was the same as used in Test Evaluation 1 except that the drive pulley 41 and the driven pulley 42 were configured to be engaged with teeth of the toothed belts B of Examples 2-1 and 2-2 and Comparative Examples 2-1 and 2-2.

In a 60° C. atmosphere, each of the toothed belts B of Examples 2-1 and 2-2 and Comparative Examples 2-1 and 2-2 was wrapped around the drive pulley 41 and the driven pulley 42, applied with a fixed axial load (SW) of 608 N to apply tension of 306 N to the toothed belt B, and applied with a load torque of 34.5 N·m. In this state, the drive pulley 41 was rotated at the number of revolutions of 4218 rpm. Then, the time until the toothed belt B was broken was measured, and the time was used as a belt durability life.

Test Results

Table 2 shows the test results. As can be seen, the durability in each of Examples 2-1 and 2-2 was significantly higher than that in each of Comparative Examples 2-1 and 2-2.

The embodiments have been described above as example techniques of the present disclosure, in which the attached drawings and the detailed description are provided. As such, elements illustrated in the attached drawings or the detailed description may include not only essential elements for solving the problem, but also non-essential elements for solving the problem in order to illustrate such techniques. Thus, the mere fact that those non-essential elements are shown in the attached drawings or the detailed description should not be interpreted as requiring that such elements be essential. Since the embodiments described above are intended to illustrate the techniques in the present disclosure, it is intended by the following claims to claim any and all modifications, substitutions, additions, and omissions that fall within the proper scope of the claims appropriately interpreted in accordance with the doctrine of equivalents and other applicable judicial doctrines.

What is claimed is:

1. A power transmission belt including an endless belt body made of an elastomer, and a cord made of carbon fibers and provided to be embedded in the endless belt body and to form a helical pattern having a pitch in a belt width direction,
    when the cord is viewed from a side orthogonal to a length direction of the cord, an angle of an outermost filament in a filament bundle of the carbon fibers forming the cord with respect to the length direction of the cord being 8° or more to 20° or less.

2. The power transmission belt of claim 1, wherein the endless belt body is made of a polyurethane resin.

3. The power transmission belt of claim 1, wherein the carbon fibers forming the cord are PAN-based carbon fibers.

4. The power transmission belt of claim 1, wherein the carbon fibers have a filament diameter of 4 μm or more to 9 μm or less.

5. The power transmission belt of claim 1, wherein a total number of filaments of the carbon fibers forming the cord is 3000 or more to 60000 or less.

6. The power transmission belt of claim 1, wherein the cord is a single twist yarn obtained by twisting a filament bundle of the carbon fibers in one direction.

7. The power transmission belt of claim 6, wherein in the cord of the single twist yarn, a total number of filaments of the carbon fibers forming the cord of the single twist yarn is 3000 or more to less than 24000, and a number of twists of the cord per 10 cm length is 2.0/10 cm or more to 25.0/10 cm or less.

8. The power transmission belt of claim 6, wherein in the cord of the single twist yarn, a total number of filaments of the carbon fibers forming the cord of the single twist yarn is 24000 or more to 60000 or less, and a number of twists of the cord per 10 cm length is 1.5/10 cm or more to 7.5/10 cm or less.

9. The power transmission belt of claim 1, wherein a number of cords per 10 mm belt width is 3/10 mm or more to 16/10 mm or less.

10. The power transmission belt of claim 1, wherein the endless belt body is an endless toothed belt body.

11. The power transmission belt of claim 10, wherein a belt tension $T_{0.1}$ per 1 mm belt width at 0.1 of a belt extension rate is 30 N/mm or more to 50 N/mm or less.

* * * * *